(12) United States Patent
Schuhen et al.

(10) Patent No.: US 7,788,009 B2
(45) Date of Patent: Aug. 31, 2010

(54) TRANSMISSION CONTROL SYSTEM AND METHOD FOR COMPENSATING PLANT CHANGES IN A TRANSMISSION CONTROL SYSTEM OF AN AUTOMATIC VEHICLE TRANSMISSION

(75) Inventors: Michael Schuhen, Buhl-Oberweier (DE); Klaus Henneberger, Buhl (DE); Marc Hauptmann, Buhl (DE)

(73) Assignee: LuK Lamellen und Kupplungsbau Beteiligungs, Buehl (DE)

( * ) Notice: Subject to any disclaimer, the term of this patent is extended or adjusted under 35 U.S.C. 154(b) by 0 days.

(21) Appl. No.: 11/825,398

(22) Filed: Jul. 6, 2007

(65) Prior Publication Data

US 2007/0265983 A1 Nov. 15, 2007

Related U.S. Application Data

(60) Division of application No. 10/961,960, filed on Oct. 8, 2004, now abandoned, which is a continuation of application No. PCT/DE03/01200, filed on Apr. 10, 2003.

(30) Foreign Application Priority Data

| Apr. 10, 2002 | (DE) | ................... 102 15 715 |
| Apr. 30, 2002 | (DE) | ................... 102 19 255 |
| Nov. 12, 2002 | (DE) | ................... 102 52 409 |

(51) Int. Cl.
    *G06F 7/00* (2006.01)
(52) U.S. Cl. .......................... 701/58; 700/28
(58) Field of Classification Search ................... 700/28, 700/29, 30; 701/58, 59
    See application file for complete search history.

(56) References Cited

U.S. PATENT DOCUMENTS

| 4,220,058 A | | 9/1980 | Petzold |
| 4,821,190 A | | 4/1989 | Patil |
| 5,281,902 A | | 1/1994 | Edelen et al. |
| 5,608,409 A | | 3/1997 | Rilling |
| 6,050,379 A | * | 4/2000 | Lyon ........................ 192/54.1 |
| 6,278,926 B1 | * | 8/2001 | Jain et al. ..................... 701/58 |
| 6,286,381 B1 | * | 9/2001 | Reed et al. ................. 74/336 R |
| 6,385,520 B1 | * | 5/2002 | Jain et al. ..................... 701/51 |
| 6,411,879 B2 | | 6/2002 | Kupper et al. |
| 6,618,631 B1 | * | 9/2003 | Johnson et al. ............... 700/28 |
| 2002/0125094 A1 | * | 9/2002 | Zimmermann et al. ..... 192/3.58 |
| 2002/0142885 A1 | * | 10/2002 | Graf et al. ................... 477/115 |
| 2004/0017996 A1 | * | 1/2004 | Yamaguchi ................. 386/46 |

FOREIGN PATENT DOCUMENTS

| DE | 19951953 | 5/2000 |
| DE | 10038331 | 2/2002 |
| WO | 00/26552 | 5/2000 |

* cited by examiner

*Primary Examiner*—Mark Hellner
(74) *Attorney, Agent, or Firm*—Simpson & Simpson, PLLC

(57) ABSTRACT

A method for compensating roadway changes in a transmission control system of an automatic vehicle transmission, according to which each change in the roadway is recognized and compensated. Also disclosed is a transmission control system of an automatic vehicle transmission, particularly for carrying out the inventive method, comprising at least one device for detecting and compensating changes in the roadway.

23 Claims, 10 Drawing Sheets

Arrangement of identification and compensation in the plant circuit

Arrangement of identification and compensation in the plant circuit

Diagrammatic representation of the compensation strategy

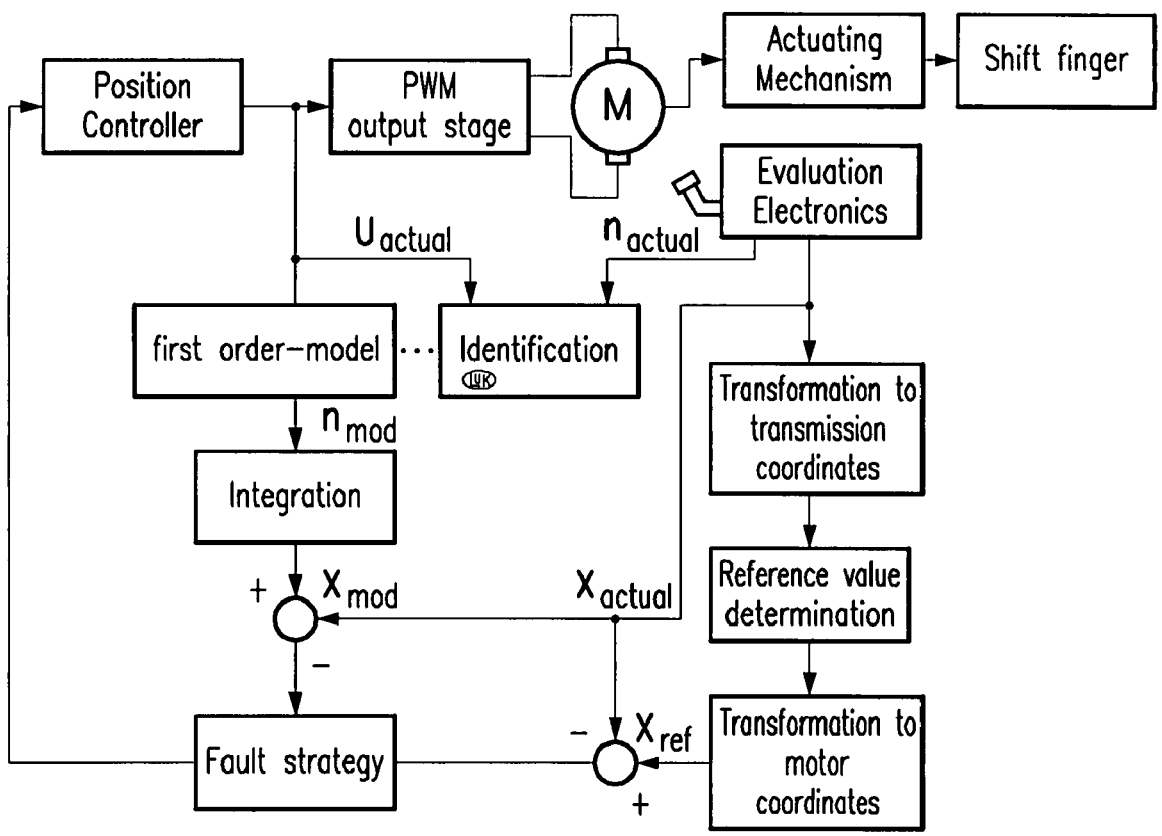

Signal flow of the transmission control system

Fig. 3

| Status | Description |
|---|---|
| 0 | No identification allowed |
| 1 | Identification activated (but not yet started) |
| 2 | Identification running (creation of the interim quantities) |
| 3 | Identification (calculation of the model parameters) |
| 4 | Fault in an identification (discontinuation of the identification) |
| 5 | Identification successfully concluded |

Fig. 4

State sequences of the identification strategy

Ua: input voltage
Ra: armature resistance
Cm: motor constants
Jm: carrier unit torque of the motor
d: friction coefficient (speed-dependent)

Discrete model of the transmission actuators

Holding element with discrete sensing

Simulation of a step response of a real (+) and modeled (o) system

TRANSMISSION CONTROL SYSTEM AND METHOD FOR COMPENSATING PLANT CHANGES IN A TRANSMISSION CONTROL SYSTEM OF AN AUTOMATIC VEHICLE TRANSMISSION

CROSS-REFERENCE TO RELATED APPLICATIONS

This application is a divisional application claiming priority of U.S. patent application Ser. No. 10/961,960 filed Oct. 8, 2004, now abandoned which was filed under 35 U.S.C. §120 and §365(c) as a continuation of International Patent Application PCT/DE03/01200, filed Apr. 10, 2003, which claims priority of German Patent Applications 102 15 715.4, filed Apr. 10, 2002, 102 19 255.3, filed Apr. 30, 2002, and 102 52 409.2 filed Nov. 12, 2002, all of which applications are incorporated herein by reference.

FIELD OF THE INVENTION

The present invention relates to a transmission control system and method for compensating plant changes in a transmission control system of an automatic vehicle transmission.

BACKGROUND OF THE INVENTION

It has been shown that, especially in an automated shift transmission, the transmission motors, such as the select and shift motors, are driven in different operating modes, for example, position-controlled or speed-controlled mode. The regulations for this are carried out, for example, in off-line mode, and are typically based on simple physical models of the transmission motors and the actuators. These models are verified using simulations and measurements. In particular, investigations on a test stand and on the vehicles have shown, however, that a changed plant behavior can cause discomfort and in unfavorable cases even malfunction or failure of the transmission actuators. Possible causes for plant changes are, for example, production-related fluctuations of the motor characteristics when the vehicle is in the new condition. Other causes include the wear and aging of the motors over their entire service life or also temporary temperature effects.

OBJECTS OF THE INVENTION

The object of the present invention is to propose a transmission control system and a method for compensating plant changes in a transmission control system of an automatic vehicle transmission so that plant changes are taken into account in the transmission control system.

The objective is achieved according to the invention by a method for compensating plant changes in a transmission control system of an automatic vehicle transmission in which any plant change is detected and compensated.

SUMMARY OF THE INVENTION

In order to prevent negative effects of plant changes, a model-based strategy for compensating plant changes may be provided according to the invention presented here that in an advantageous way makes it unnecessary for the control parameters and force requirements implemented in the control software to be adapted when said strategy is employed.

Within the framework of the invention presented here, a model-based compensation strategy, especially for transmission motors and for the actuators, is proposed with which an identified plant change may be compensated in relation to a reference model without the parameters and requirements implemented in the software having to be adapted.

This compensation strategy preferably includes a differentiation between temporarily occurring temperature-related plant changes and long-term changes in plant behavior that are a function of the software, operation of the vehicle, and the hardware. It is conceivable that additional suitable aspects may be taken into consideration in the strategy of the present invention. For example, in the strategy of the invention, also an adaptation of the compensation for the changed plant behavior, a limitation of the compensation and/or a memorization of the long-term plant changes may be considered.

It is especially advantageous in the compensation strategy according to the invention presented here that this compensation strategy is based on simple parametric models of the transmission motors and/or the actuators. The model parameters may be identified under consideration of predetermined limit conditions, preferably and online mode, during a gear change, for example, in the position-controlled mode of the transmission motors. For example, a suitable parameter estimating method may be implemented in the control software for this purpose. The voltages $U_k$ that are compensated and limited, for example, to the maximum battery voltage and the measured transmission motor speeds n or the like may be used for the identification. It is also possible that other parameters and variables may be considered in this context.

The deviations of the identified model parameters from the parameters of the reference model may theoretically be used for the derivation of a complete, especially dynamic compensation strategy. However, because of the simple plant model, the delays in the acquisition of the motor speeds or the like, a partially static compensation of the plant changes in a plurality of steps may be expedient.

After a successfully executed identification, a new static gain k may first be calculated using the new model parameters in a first step 1.

In a second step, static gain k is appropriately corrected with temperature compensation 7, which is already implemented in the control software and occurs before the limitation of the position controller voltages $U_R$, which are used as the manipulated variables, to the maximum battery voltage and the conversion to, for example, PWM (pulse width modulation) variables. The correction performed has the objective of dividing the long-term plant changes from the temperature-related and temporary changes and compensating for the uncertainties included in temperature compensation 7. One possible uncertainty may, for example, consist of the fact that the compensation is made on the basis of the transmission temperature, which is calculated in the control software using a temperature model. The temperature conditions on the transmission motors are not known under certain circumstances. From a control technology perspective, the temperature compensation can therefore only assume the function of a precontrol, with which, however, it is at least still possible to compensate for temperature-related plant changes within a certain context when there is a failure of the identification.

The filtering of the static gain $K_1$ carried out in a third step of the compensation strategy of the invention is used for weighting new gain values and therefore determines the adaptation speed of the compensation of a changed plant behavior, a discrete first order filter preferably being used. However, it is also possible to use other filters for filtering in the compensation strategy of the invention. The filter constant may, for example, be constant or also be predetermined as a function of other boundary conditions. For example, the temperature, its change, or similar parameter may be used as a boundary condition.

The filtered gain value $K_2$ may then be limited to a defined value range, which is carried out in a fourth step. In the process, aspects such as the robustness of the control system or the protection of the actuators may be diminished if the dynamics of the plant are increased; this means that the system is more sensitive to disturbances and simultaneously the static gain is increased by the compensation, which corresponds to an additional excitation of the system.

The initialization of compensation gain $K_c$ that results from the executed limitation may occur on a one-time basis after startup with static gain $K_r$ of the reference model. The compensation gain, which normally changes during operation, may preferably be stored in the so-called EEProm within the context of a fifth step, for example, in the "ignition off" state. This stored value may be used, for example, as a starting value in the next "ignition on" state. Plant changes that occur between the "ignition off" and "ignition on" states due to temperature may then be compensated by the temperature compensation. To take into account the uncertainties in the temperature compensation, possibilities may also be provided in which the gain value is preferably only stored if the transmission temperature is within a defined range and/or if there is a specified number of successfully executed identifications, which is a function of the value of the filter constant. Other possibilities for taking into account the uncertainties in the temperature compensation are also conceivable.

The primary static compensation of position controller voltage $U_R$, for example, may be carried out in a sixth and final step of the method of the present invention. In this context, the compensated voltage $U_c$ may result from the product of $U_R$ and the ratio $K_R/K_c$.

In order to improve the strategy of the present invention, it may be provided that additional appropriate steps are integrated in the strategy of the invention or also another desired combination of the aforementioned steps is provided.

The compensation strategy presented here may preferably be used in all vehicles that have an automated shift transmission (ASG). It is also conceivable that the present strategy be used in vehicles having other transmissions.

It is especially advantageous in the strategy presented here that the compensation may be combined with a suitable adaptation of the control parameters. It is also conceivable that the adaptation of the control parameters or the like is carried out independently of the compensation that is carried out.

Within the context of an advantageous variant of the present invention, an online identification for the model of each transmission motor may be provided in particular with a robust fault recognition of the incremental position measurement.

According to the invention presented here, a sufficient quality of the fault recognition may be guaranteed for the incremental position measurement, preferably using an appropriate software measure, such as an online identification for the already implemented model, e.g. of an ASG transmission motor. In this context, it may be provided that during the shift and select operations, especially in the position-controlled model, the signals of the input voltage and/or the speed of the transmission motors is used in order to identify the plant behavior of the motors in the online state.

Preferably, a discrete-time motor model for the transmission motors, for example, may be used for the transmission motors. The discrete-time model may preferably be composed of a first-order model and an integrator or the like. In this context, input voltage $U_{k-1}$ and motor speed $N_{k-1}$ of a position controller are detected beforehand and used as input variables of the first-order model. The current modeled motor speed $n_k$ may be converted in the integrator into corresponding motor increments $x_k$.

This results in the following equation for the first-order model:

$$n_k = A \cdot n_{k-1} + B \cdot u_{k-1}$$

For the integrator the following equation arises:

$$x_k = x_{k-1} + K \cdot T_A \cdot n_k$$

If parameter K is represented as a constant ratio between the rotary angle of the motor and the motor increments, parameters A and B e.g. cannot be constant. They can change accordingly because of variation in the production batch, operating temperature, service life of the motors or the like.

This means that, in order to realize a robust modeling, parameters A and B are appropriately identified during the operation in the vehicle. In this context, the identification method of the so-called least-squares method or the like may be used. There, in the position-controlled state, motor speed n and motor voltage u are read in during each position controller interrupt of, for example, 5 ms and the multiplied values are totaled corresponding to the following equations:

$$\Phi_{nn}(0) = \sum_{0}^{N-1} n(i) \cdot n(i)$$

$$\Phi_{un}(0) = \sum_{0}^{N-1} n(i) \cdot u(i)$$

$$\Phi_{uu}(0) = \sum_{0}^{N-1} u(i) \cdot u(i)$$

$$\Phi_{nn}(1) = \sum_{1}^{N} n(i) \cdot n(i-1)$$

$$\Phi_{un}(1) = \sum_{1}^{N} n(i) \cdot u(i-1)$$

In the preceding equations, the number N of the sum is directed toward the duration of the position-controlled mode during a shift. Consequently, the number N corresponds to the quantity of position controller interrupts within the position-controlled mode during a gear change.

For example, it may be provided that upon termination of the position-controlled shift and select operation the calculated interim values are used to determine parameters A and B of the discrete-time first-order model. For this purpose the following equations may be used:

$$A = \frac{-\Phi_{uu}(0) \cdot \Phi_{nn}(1) + \Phi_{un}(0) \cdot \Phi_{un}(1)}{\Phi_{uu}(0) \cdot \Phi_{nn}(0) - [\Phi_{un}(0)]^2}$$

$$B = \frac{-\Phi_{un}(0) \cdot \Phi_{nn}(1) + \Phi_{nn}(0) \cdot \Phi_{un}(1)}{\Phi_{uu}(0) \cdot \Phi_{nn}(0) - [\Phi_{un}(0)]^2}$$

According to a further development of the present invention, a predetermined sequence of the proposed identifications are provided. In order to be able to control and monitor the sequence in a targeted manner, various states of the identification may be defined. The individual states during an identification may be run through in the so-called handshake procedure.

Appropriate transitional conditions have been specified for the state sequences of the identification strategy.

In order to detect the aforementioned faults as early as possible, a modeling of the ASG (automated-shift gearbox) transmission actuators may be implemented. These possible models can, for example, determine the speeds and rotor positions to be expected from the motor voltages and in so doing accordingly compare the modeled variables with those of the incremental position measurement. If the difference of the two values exceeds a predetermined threshold, an error in the incremental position measurement may be assumed. In this context, the confidence measure is set to 1 (guess) and a neutral reference run is summoned, which sets the successful balancing of the confidence measure back to 2 (coarse). When a fault is detected, an entry may be made in the fault store. It is possible that the proposed fault strategy is appropriately modeled in order to improve the fault recognition.

In measurements in the climatic chamber, it has been shown that the models of the transmission motors are too imprecise, especially at very low temperatures, e.g. at approximately −30° Celsius. At these temperatures, fault detections may occur although no fault in the incremental measurement has actually occurred. A reason for this may be the change in the plant behavior of the transmission actuators when there are temperature changes. The previous model cannot be set for this because the model parameters are constant.

The same effect is present if transmission motors are used that are at the outermost limits of the manufacturing tolerances, because the determination of model parameters is carried out on the basis of a standardized transmission motor under normal operating conditions. Resulting from this is the requirement that the model parameters must be adapted to the real plant behavior present for each of the transmission actuators. In this way, a long-term robust fault recognition of the incremental position measurement can be realized.

In an implementation of the proposed strategy, a time window may preferably be provided for the identification. An identification can be carried out, on the one hand, if there is a constant excitation of the system that is supplying current to the motors, and, on the other hand, the identification can be carried out if the movement of the transmission actuator runs freely in the shift gate. Therefore, the identification should be limited in time during a shift, because, for example, no free-running movement of the motors during the synchronization, and therefore the result of an identification could be distorted. Therefore, the provision of a time window during the identification is especially advantageous. It is also possible to carry out the implementation in another way.

Another embodiment of the present invention may provide that preferably the current strength or the like is estimated, for example, with an observer on software side, especially in ASG transmission motors.

According to the present invention, it may be provided that the currents of the ASG transmission motors are preferably estimated by an observer on the software side, and as a result a current limitation on the software side can also be carried out. It is possible that the observer identifies the plant behavior of the transmission motors and e.g. the required current strength accordingly estimates the determined plant parameters, the applied voltage and/or the measured motor speed.

In this context, the plant behavior of the transmission motors may be represented using, e.g. a continuous-time first-order model having variable parameters that corresponds to equation 1 below. Regarding the movement equation of a d.c. motor, the parameters a and b can be calculated from the parameters A and B of the discrete-time model which are identified during a gear change in the position-controlled state:

$$\dot{n} = a \cdot n + b \cdot u \qquad \text{Equation 1.}$$

n: motor speed,
a, b: motor parameters,
u: motor voltage

With the general equations of a DC motor and while disregarding the inductivity, the following equations result:

$$U = R \cdot I + k_\Phi \cdot \omega \qquad \text{Equation 2.}$$

R=armature resistance [Ω]
I=current strength [A]
$k_{101}$ =motor constant [Vs]
ω=angular frequency [1/s]

$$J\dot{\omega} = k_{101} \cdot I \qquad \text{Equation 3.}$$

J=motor inertia
$\dot{\omega}$=motor acceleration.

Using the conversion, the equation and a coefficient comparison with Equation 1 via parameters a and b, the physical parameters can be determined:

$$a = -\frac{k_\Phi^2}{J \cdot R}. \qquad \text{Equation 4}$$

$$b = \frac{60}{2\pi} \cdot \frac{k_\Phi}{J \cdot R}. \qquad \text{Equation 5}$$

Under the assumption that the motor inertia J is predetermined, only 2 unknowns result for the predetermined equation system, namely armature resistance R and motor constant k. In this way, the physical parameters are determined via the identified parameters a and b by solving the equations. The following equations result:

$$|k_\Phi| = \frac{60}{2\pi} \cdot \frac{a}{b}. \qquad \text{Equation 6}$$

$$|R| = \frac{1}{J} \cdot \left(\frac{60}{2\pi}\right)^2 \cdot \frac{a}{b^2}. \qquad \text{Equation 7}$$

$$I = \frac{U - k_\Phi \cdot \frac{2\pi}{60} n}{R}. \qquad \text{Equation 8}$$

Therefore it is now possible using the known values of motor voltage U and motor speed n to estimate current strength I via the method of the invention. In this way, the current peaks can be detected accordingly and a correspondingly strong load of the vehicle electrical system is compensated so that no light flickering can occur in headlights or tachometer lighting.

The object of the present invention may also be achieved via a transmission control of an automatic vehicle according to the invention, especially for carrying out the proposed method, that has at least one device for detecting and compensating plant changes.

BRIEF DESCRIPTION OF THE DRAWINGS

Additional advantages and advantageous embodiments emerge from the dependent claims and the drawings described below. In the drawing:

FIG. 3 is a block diagram of a signal flow in the transmission control system;

FIG. 4 is a table of the status of a sequence of an identification strategy;

DETAILED DESCRIPTION OF THE INVENTION

Figure 1:
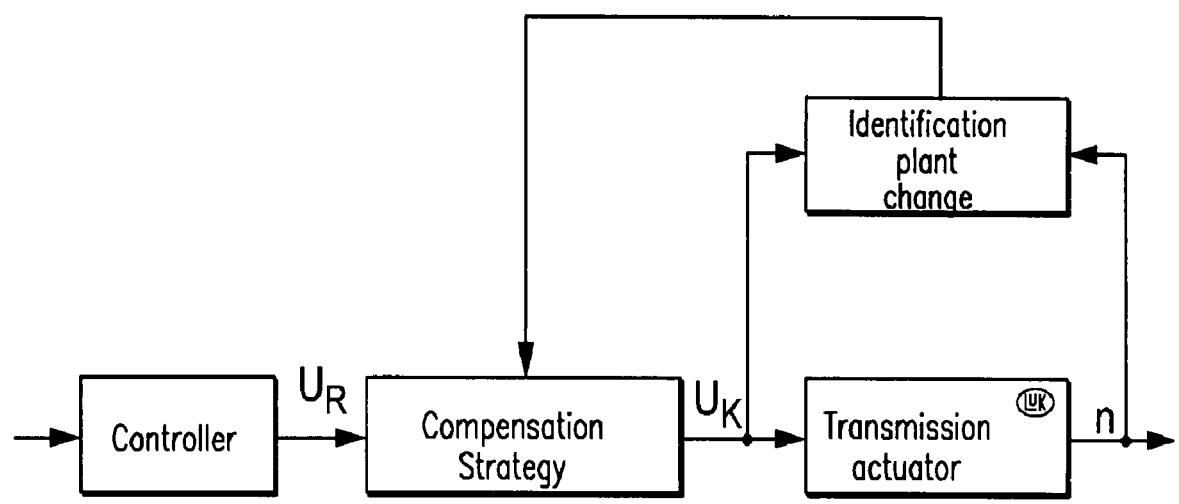
FIG. 1 is a block diagram of a possible embodiment of the method of the invention.

A possible sequence diagram of the compensation strategy is schematically illustrated in FIG. 1. There, the arrangement of identification and compensation is indicated in a corresponding control system.

This compensation strategy includes a differentiation between temporarily occurring temperature-related plant changes and long-term changes of the plant behavior that are a function of the software, operation of the vehicle, and the hardware.

Figure 2:
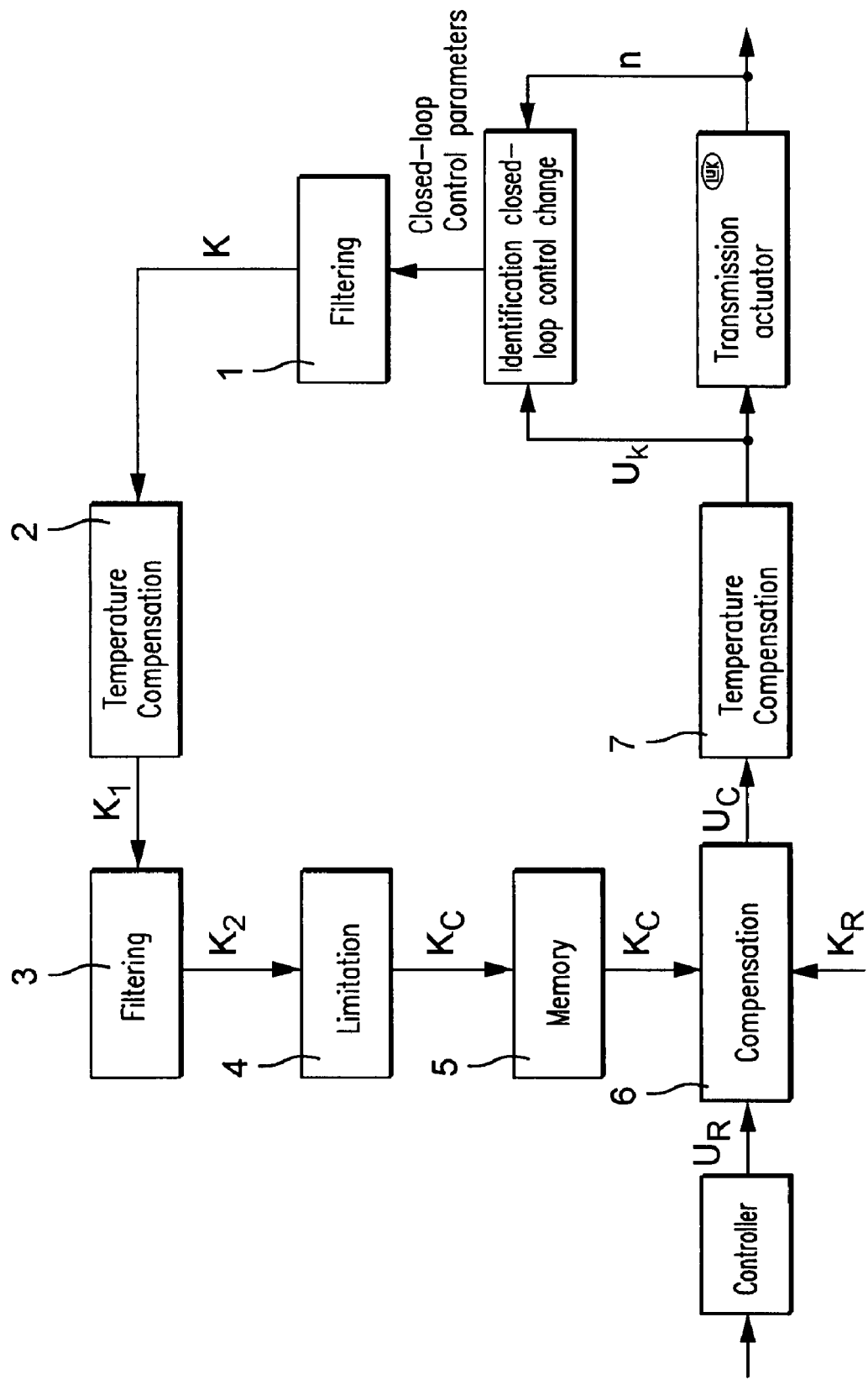
FIG. 2 shows a detailed illustration according to FIG. 1.

A possible static compensation strategy may preferably include the following steps that are schematically illustrated in FIG. 2, the individual steps being consecutively numbered 1 to 6.

After a successfully executed identification, a new static gain k can first be calculated using the new model parameters in a first step 1; see FIG. 2.

In a second step 2, the static gain k is suitably corrected using temperature compensation 7, which is already realized in the control software and occurs before the limitation of the position controller voltages $U_R$, which are used as manipulated variables, at the maximum battery voltage and the conversion to, for example, PWM (pulse-width modulation) variables. The executed correction has the objective of separating the long-term plant changes from the temperature-related and temporarily occurring changes and of compensating the uncertainties contained in temperature compensation 7. One possible uncertainty may be the fact that the compensation is made on the basis of the transmission temperature, which is calculated in the control software using a temperature model. The temperature conditions on the transmission motors under certain circumstances are not known. From a control technology perspective, the temperature compensation may therefore only assume the function of a precontrol, but with which temperature-related plant changes may be compensated when there is a failure of the identification at least still within a certain context.

The filtering of static gain $K_1$ carried out in a third step 3 of the compensation strategy is used for the weighting of new gain values and therefore determines the adaptation speed of the compensation of a changed plant behavior, a first order discrete filter preferably being used. However, it is also possible to use other filters in the compensation strategy according to the invention. The filter constant may, for example, be constant or also be predetermined as a function of other boundary conditions. For example, the temperature, its change or the like may be used as boundary condition.

The filtered gain value $K_2$ may then be limited to a defined value range, which is carried out in a fourth step 4. As a result, aspects like the robustness of the control or the protection of the actuators and the transmission motors may appropriately be taken into consideration. The robustness of the control may be impaired, for example, if the dynamics of the plant are increased; this means that the system is more sensitive to interferences and simultaneously the static gain is simultaneously increased by the compensation, which corresponds to an additional excitation of the system.

The initialization of compensation gain $K_c$ resulting from limitation 4 may preferably occur on a one-time basis with static gain $K_r$ of the reference model after startup. The compensation gain normally changing during operation may preferably be stored in the so-called EEProm within the context of a fifth step 5, e.g., in the "ignition off" state. This stored value may be used, for example, as a starting value in the next "ignition on" state. Temperature-related plant changes occurring between the "ignition off" and "ignition on" states may then be compensated by temperature compensation 7. To consider the uncertainties in the temperature compensation, possibilities may also be provided in which the gain value is then stored preferably only in the "ignition off" state if the transmission temperature is within a defined range and/or a specified number of successfully executed identifications that depends on the value of the filter constants is present. Other possibilities for taking into consideration the uncertainties in the temperature compensation are also conceivable.

In a last step 6 of the strategy of the invention, the primary static compensation of position controller voltage $U_R$, for example, may be carried out. The compensated voltage $U_c$ can therefore result from the product of $U_R$ and the ratio $K_R/K_c$.

It has been shown that the previously described online identification for fulfilling the pre-determined requirements is especially advantageous. A corresponding signal flow diagram of the transmission control system for an online identification of the transmission actuators is shown in FIG. 3. The position of the identification in the signal flow plan of the incremental position measurement is depicted in FIG. 3. Only if no fault detection is present are motor speed $n_{ist}$ and motor voltages $u_{ist}$ determined during the shift and select processes and in each case after a completed shift are the determined model parameters adapted accordingly in the first-order model. This occurs independently of each other both in the shift motor and in the select motor. From this it emerges that the online identification illustrated in FIG. 3 is usable both for the select actuator and for the shift actuator.

The identification sequence may be provided, as represented in a FIG. 4, as a table. In order to ensure a controlled sequence of the identification, it may be necessary to introduce a status for the identification. Consequently, the individual states of the identification are uniquely identified and the sequence is suitably controlled (FIG. 4).

Figure 5:
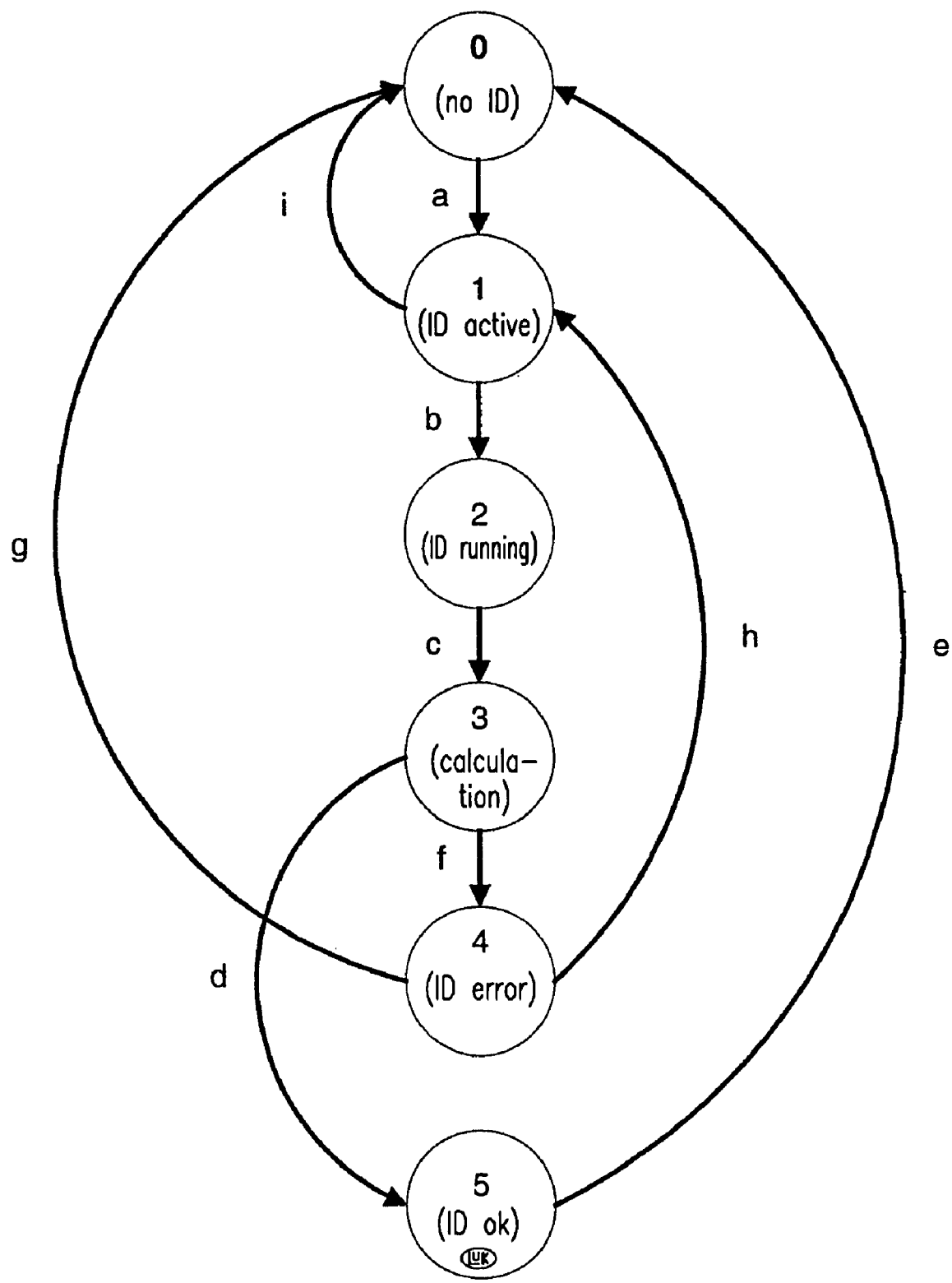
FIG. 5 shows a view of the state sequences of the identification strategy according to FIG. 4.

FIG. 5 then shows the possible sequences during an identification strategy according to the present invention in the form of a state illustration. In it the possible entry conditions for the individual states are described in a table depicted in FIG. 6. The starting state is generally the state 0 (no identification allowed). If the status is set to 0, the identification can be deactivated. It is conceivable that the identification of the shift and select motor is separately activated. Therefore, it is possible to deactivate the identification for shifts that require no select movements.

Figure 6:
FIG. 6 shows a view of the transmission conditions of the states according to FIGS. 4 and 5.

The associated state sequences of the identification strategy of the invention are illustrated in FIG. 5, corresponding transitional conditions of the states being indicated in an additional table in FIG. 6.

Moreover, when there is a fault detection of the incremental position measurement via the model of the transmission motors, the identification may, for example, be cut short. In state 2, the speeds and the motor voltages are acquired and the interim quantities of the identification are calculated. In state 3, the interim values determined in status 2 are used in order to calculate the discrete-time model parameters (A, B). If the calculated parameters are within a plausible range (see FIG. 7), the identification status e.g. may be set to 5. Thus, the identification may be successfully concluded and the identified model parameters may further be used in an advantageous manner.

Figure 7:
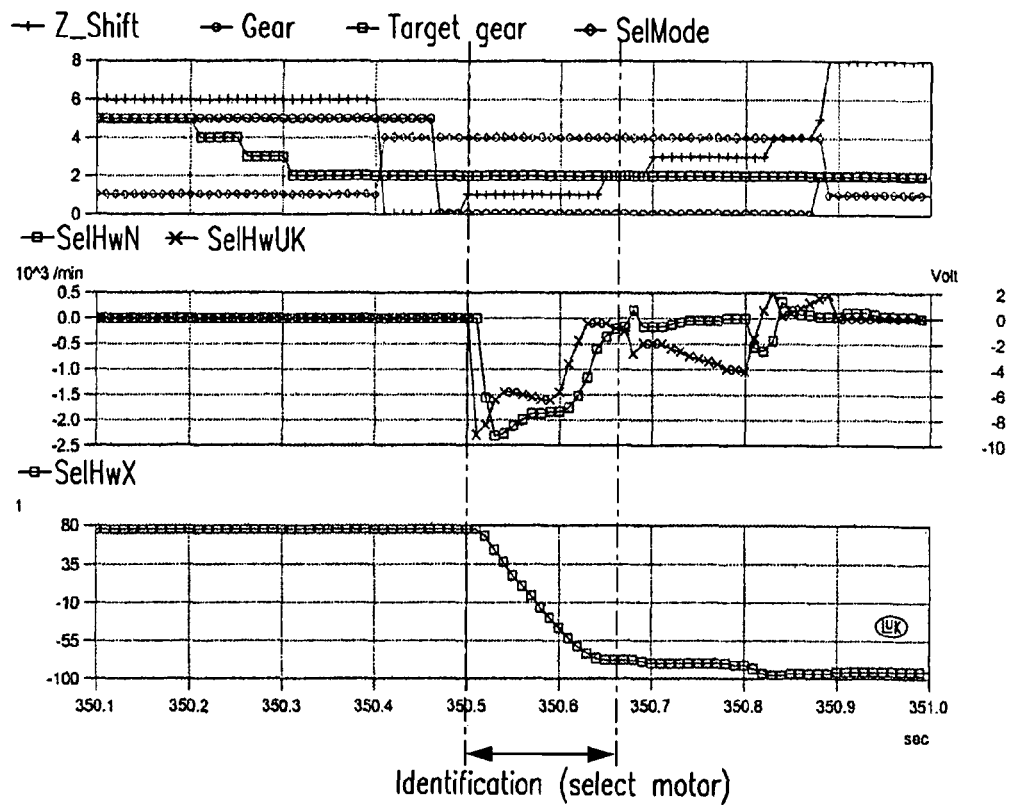
FIG. 7 shows a select operation in a 5-2 shift.
Figure 8:
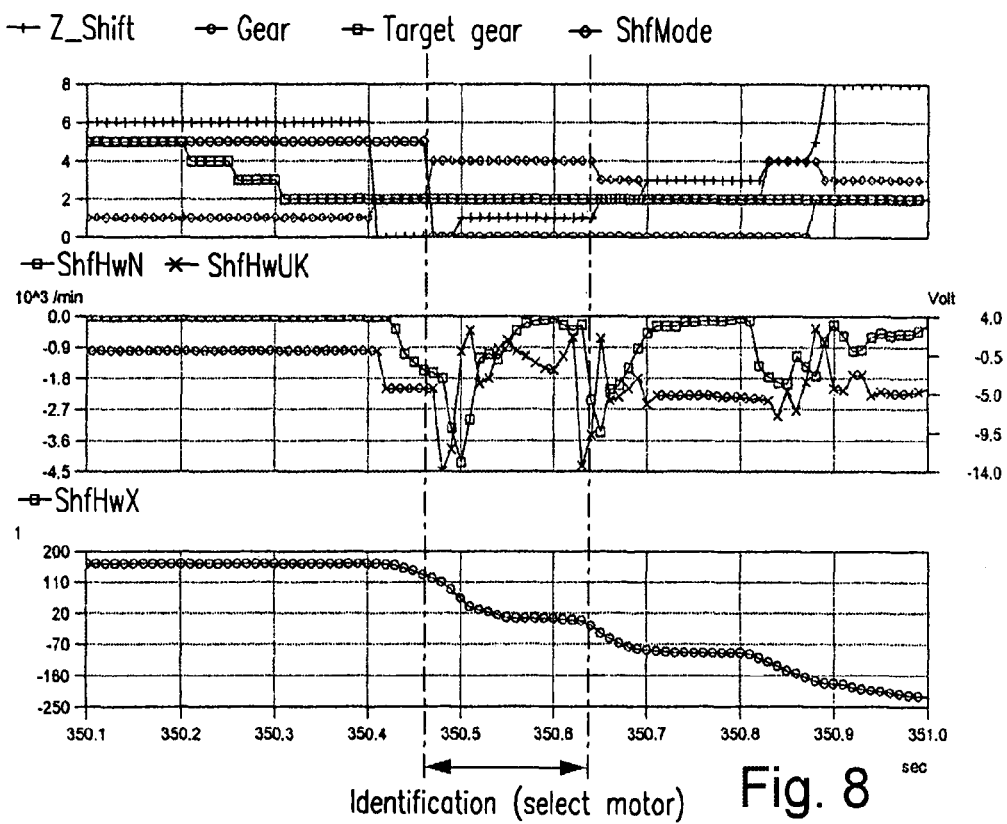
FIG. 8 shows a shift movement during a 5-2 shift.

Illustrated in FIG. 7 is, for example, a select operation of a 5-2 shift. Shown in FIG. 8 is the complete shift movement during the 5-2 shift. In this context, the individual shifting states are clearly recognizable:

| | |
|---|---|
| Disengage gear | (Z_Shift = 0) |
| Select in neutral range | (Z_Shift = 1) |
| Synchronization | (Z_Shift = 2) |
| Engage idle position | (Z_Shift = 4) |
| Idle position reached | (Z_Shift = 6) |
| Lever in gear | (Z_Shift = 8). |

For possible faults, the states Sync-Problem (3) and meshing problem (5) can also occur.

In shift state 1, the free-running select movement of the select motor takes place within the neutral gate, while the shift movement in the direction of neutral gate shift state 0 and shift state=1 occurs. In so doing, the motors should be in position-controlled mode (SelMode=4) and ShfMode=4). In this area the identification and also the modeling of the transmission actuators may take place. Also the biasing of the shift motor at approximately 2 to 4 volts shows no effect with respect to the identification parameters. Because the motors are also not in position-controlled mode, the identification cannot be started.

Figure 9:
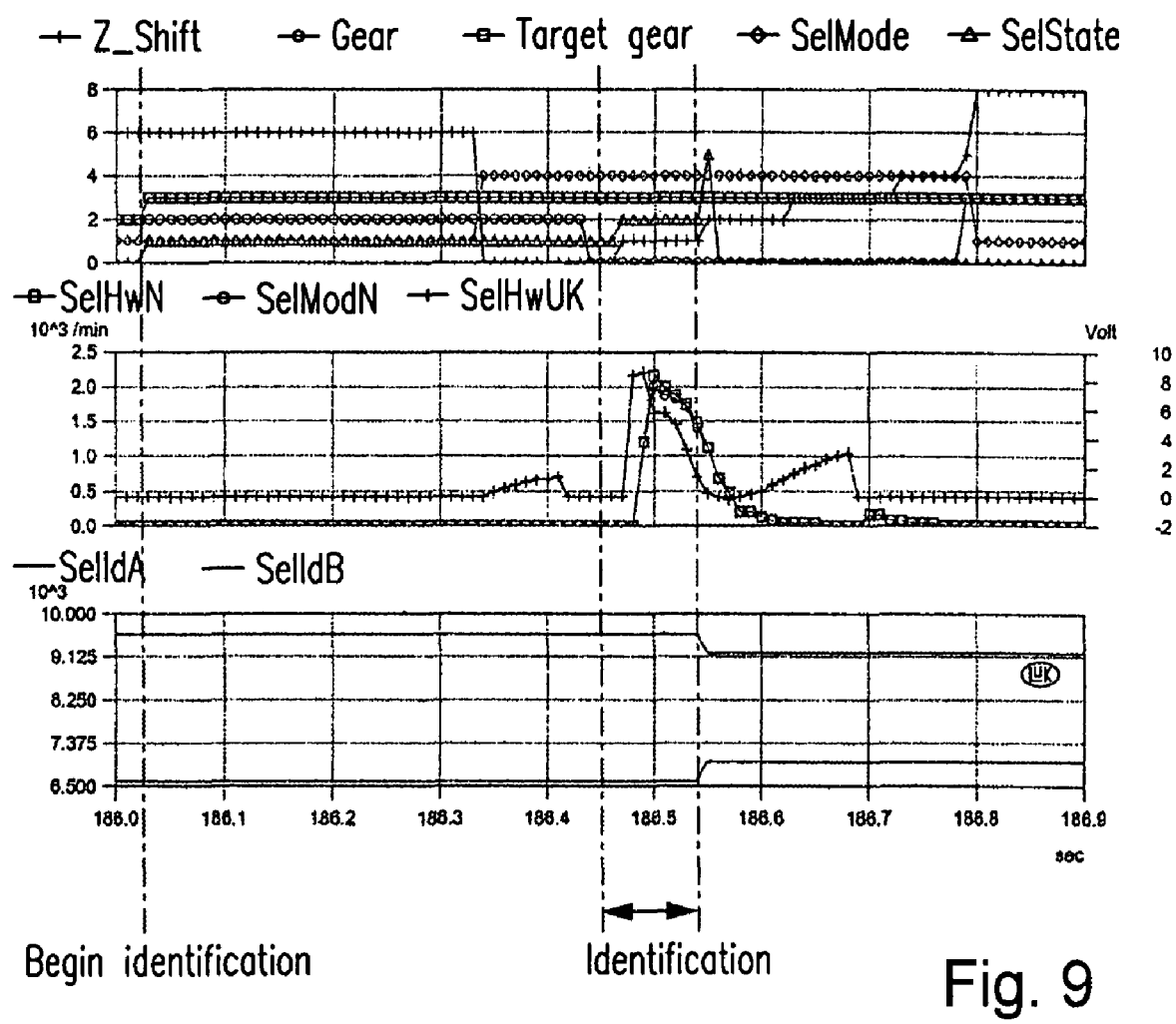
FIG. 9 shows a sequence of an identification of the select actuator in a 2-3 shift.

Illustrated in FIG. 9 is a possible identification strategy for the select actuator of a 2-3 shift. In changes of the target gear, the identification is activated (SelState=1). If the shift state on shift/select (Z_Shift=1) is provided, the identification may be started. In this context the motor voltages and the motor speeds are read in and the interim quantities are calculated. If the free-running select movement is concluded (Z_Shift=2), parameter A (SelldA) and parameter B (SelldB) may be determined. Thereafter, the identification is, for example, deactivated (SelState=0).

Within the context of an advantageous further development of the invention, additional strategies may be provided. For example, the correctness of an identification may be checked. The prerequisite of a calculation of the parameters is, for example, the correct determination of the interim quantities. In order to guarantee this, it may be necessary to carry out some security measures before a parameter calculation, exemplary security measures being listed below wherein said list is not necessarily exhaustive:

1. Amount of measured data is too small; the interim quantities are calculated via the read-in value pairs of motor voltage and motor speed, for example. If the amount of measured data is insufficient, a reliable cannot be guaranteed. Therefore, a check may be made of whether the number is above a predetermined threshold. This threshold may be set in accordance with experience to, for example, 10 pairs of values. Other values are also possible for the threshold. If the number after a shift is less than 10, no new parameters are identified. The model parameters may then contain their old values. The identification can be cut short, for example, and the parameters therefore are not updated (SelState=4). If the amount of measured data is too little and therefore no identification is carried out, an interruption of the identification may be provoked since the number of value pairs (SelHwN, SelHwUk) to be measured is increased (minimum number=20 value pairs). Therefore, this shift may result in the identification being cut short because the number of value pairs (while SelState=2) equals 12. Therefore, the SelState on the value 4 is valid (corresponds to errors in the identification). In this context, the parameters may remain constant and contain the already determined value and not updated.

2. An overflow of the interim quantities; the interim quantities are calculated by totaling the measured values. Therefore, the danger may exist that the interim values overflow. In order to detect an overflow, a check may be made before each summation of whether the value range is exceeded. Only if the value range is not exceeded, for example, may the summation be carried out. Otherwise, the summation may be discontinued, and the already calculated values of the interim quantities are still used to determine the current model parameters. In this case, the parameters are not updated. However, if the amount of measured data is sufficient, it may be provided that new parameters are nevertheless calculated after the discontinuation of the identification with the already calculated summation quantities (Shfstate=5).

It is also possible that security measures other than the two aforementioned ones are used in the strategy of the invention.

As far as an initialization is concerned, it may be provided that the model parameters are re-determined, for example, according to the "ignition on" state. This means that they are not stored in the "ignition off" state in the EEProm (electronic memory). This is because the parameters may change significantly in the "ignition off" state, for example, if the vehicle is parked overnight, to the effect that in the "ignition on" state they may no longer be used for fault detection. The following initialization routine may therefore preferably be run through:

1. After the first successful identification, the model parameters may be adopted from the identified parameters, i.e., $P_{mod}=P_{ident}$;
2. The model for fault recognition of the incremental position measurement is therefore still deactivated;
3. After each successful identification, the model parameters can be filtered;
4. For example, after three successful identifications, the model may be activated for the fault detection.

This means that the model, e.g., after each "ignition on" state may run through a delay of three successful identifications until the parameters have been set to reliable values. Only then may the model and with it the fault detection of the incremental position measurement be activated. It is also conceivable that other initialization routines or even desirable combinations of other possible routines may be used.

In the filtering already mentioned under 3 in the aforementioned initialization routine, the models of the shift and select actuators may be executed only after three successfully executed identifications because of, for example, the robustness of the identified model parameters. Because there is a scant dispersion with respect to the identified parameters, it may be advantageous to weight the newly identified parameters with those of the parameters already previously identified. In this context it is possible to differentiate between model parameters $P_{mod}$ and identification parameters $P_{ident}$. The identification parameters are determined using the calculation routine after each shift. The model parameters are the parameters that may be used for the implemented models of the shift and select actuators. They can be calculated, for example, only after each successfully executed identification as follows:

$$P_{Mod} = P_{Mod} \times \frac{2}{3} + P_{Ident} \times \frac{1}{3}. \qquad \text{Equation 3.1}$$

This means that the parameters already used in the model are adopted, for example, to a ⅔ extent and the newly determined parameters are preferably adopted to a ⅓ extent in order to calculate the current model parameters.

Figure 10:
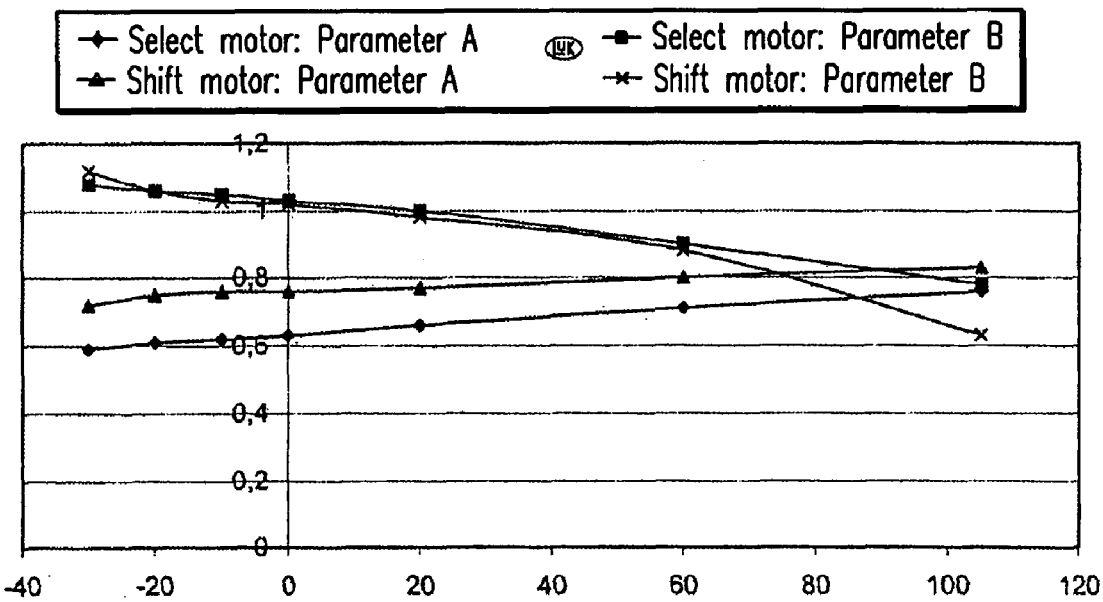
FIG. 10 is a diagram with the temperature-dependent model parameters of the shift and select actuator.

In order to verify the robustness of the models with respect to the plant changes based on temperature differences, shifts can be carried out in a climatic chamber at temperatures of −30° C. to 105° C. In this context, it has been shown that during identical shift cycles the average model parameters A and B are recorded for shift and select actuators at different temperatures. The dispersions regarding the individual identifications are approximately 5-8%. The result of the averaged model parameters is illustrated in FIG. 10. It is evident from this that the fault detection of the incremental position measurement can be kept robust in an advantageous manner only through an online identification of the transmission motors and a suitable adaptation of the motor models.

A special situation is also conceivable in which the identification and modeling strategy is illustrated after a reset. After a reset, the model parameters are reset to 0 and the model is deactivated. This may reduce the uncertainties of the plant behavior with respect to the modeling after a reset. After three successful identifications, the model may then be reactivated. In this context, the values of the identified model parameters were also adopted in the output of the long-term measurement in order to be able to set up a long-term observation and diagnosis.

Overall, it has been shown that the online identification of the actuator model enables a robust fault detection of the incremental position measurement because an identification of the plant behavior is carried out during operation. Therefore, plant changes due to temperature influences, service life and variation in the production batch of the transmission motors are taken into account accordingly. It is possible that an adaptation of the position controller is also carried out via the identified behavior of the plant. In this way an optimal control response can be realized. The compensation strategy for the position controller also uses the identified parameters of the transmission actuators in order to compensate for the changes of the plant via a change of the position controller voltage.

To summarize, it may be determined that the developed online identification for the transmission actuators is enabled to adapt the models on the basis of changes of the plant behavior. Therefore, a long-term adaptation and a sufficient robustness of the models is guaranteed.

Figure 11:
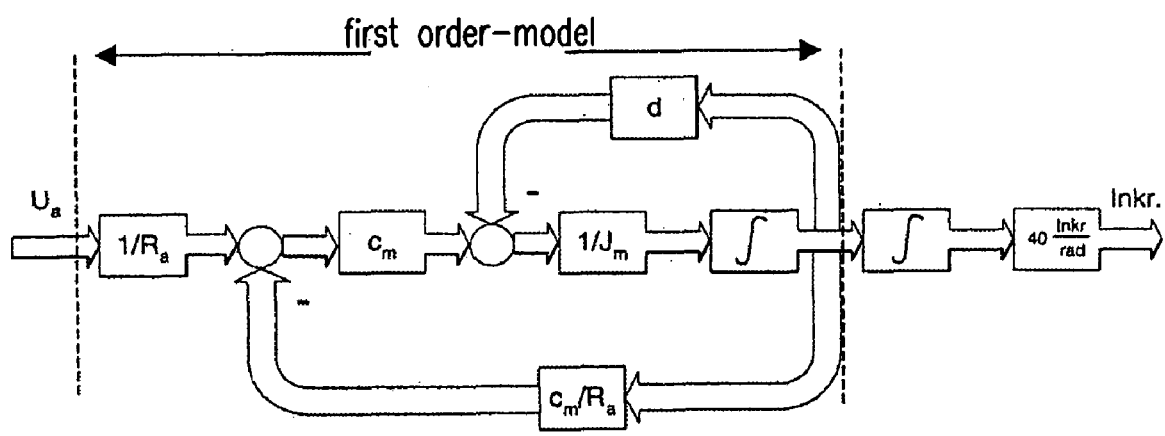
FIG. 11 shows a model of the transmission motors.

The DC motors of the transmission actuators are able to move the shift fingers in the gates via the actuators. The speed and positions are directly measured via Hall sensors directly at the motors. The transmission actuator shows with regard to the armature voltage and the motor speed a first-order characteristic if the shift finger runs freely in the shift gate. With regard to the motor position, the motors show a second-order characteristic. This means that a series connection of a first-order model and an integrator is provided. This is also illustrated in FIG. 11. There, the plant behavior of the transmission actuators is appropriately modeled.

The equations for the motor model depicted in FIG. 11 are as follows:

$$U_a = R_a \cdot i_a + L_a' \cdot \dot{i}_a + c_m \cdot \omega_m \qquad \text{Equation 1.1}$$

$$U_a = R_a \cdot i_a + \underbrace{L_a \cdot \dot{i}_a}_{\approx 0} + c_m \cdot \omega_m.$$

$$M_m = c_m \cdot i_a \qquad \text{Equation 1.2.}$$

$$J_m \dot{\omega}_m = M_m - d \cdot \omega_m \qquad \text{Equation 1.3.}$$

Because of the negligibly small inductivity $L_a$ ($L_a/R_a \sim 0.0008$), the term formed in Equation 1.1 can be set equal to 0. The disregard of the inductivity can also be carried out during the actual controller design. A continuous-time state representation may be indicated by the following equation:

$$\begin{bmatrix} \dot{n} \\ \dot{x} \end{bmatrix} = \begin{bmatrix} -\frac{c_m^2}{R_a \cdot J_m} - \frac{d}{J_m} & 0 \\ \frac{N_{puls}}{60} & 0 \end{bmatrix} \cdot \begin{bmatrix} n \\ x \end{bmatrix} + \begin{bmatrix} \frac{c_m}{R_a \cdot J_m} \cdot \frac{60}{2\pi} \\ 0 \end{bmatrix} \cdot U_a. \qquad \text{Equation 1.4}$$

wherein:
$\omega_m$: angular frequency [1/s]
n: motor speed of the drive motors [1/min]
x: motor position [increments]
Npuls: number of motor increments per revolution.

A continuous-time movement equation may then be as follows:

A continuous movement equation may then be as follows:

$$\dot{n} = \underbrace{\left(-\frac{c_m^2}{R_a \cdot J_m} - \frac{d}{J_m}\right)}_{a_k} \cdot n + \underbrace{\left(\frac{c_m}{R_a \cdot J_m} \cdot \frac{60}{2\pi}\right)}_{b_k} \cdot U_a. \qquad \text{Equation 1.5}$$

$$\dot{x} = \underbrace{\frac{N_{puls}}{60}}_{K} \cdot n. \qquad \text{Equation 1.6}$$

$$\Rightarrow \dot{n} = a_k \cdot n + b_k \cdot U_a. \qquad \text{Equation 1.7}$$

$$\dot{x} = K \cdot n. \qquad \text{Equation 1.8}$$

A discrete-time illustration of the movement equation 1.7 or 1.8 shows the equations already mentioned previously:

$$n_k = A \cdot n_{k-1} + B \cdot u_{k-1} \qquad \text{Equation 1.9.}$$

$$x_k = x_{k-1} + K \cdot T_A \cdot n_k \qquad \text{Equation 1.10.}$$

wherein:
A: model parameter
B: model parameter
TA: sampling period (5 ms)
K: conversion factor between motor speed and motor increment=Npuls/60
n: motor speed (k: current interrupt, k−1: interrupt before)
x: motor increments (k: current interrupt, k−1: interrupt before).

Figure 12:
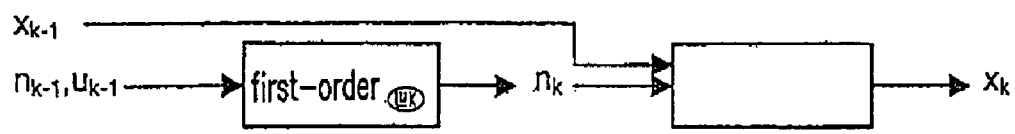
FIG. 12 shows another discrete-time model of the transmission motors.

Graphically illustrated in FIG. 12 are exemplary discrete modules of the transmission motors. The dynamic system behavior may be portrayed, for example, by parameter A while the gain of the system is illustrated by parameter B. The conversion of the motor speeds into increments may be accomplished using an integrator or similar device (equation 1.6). In this context there may be a constant conversion factor K between the number of increments per revolution and a constant sensing time of e.g. 5 ms (reading in the measured data). In FIG. 12 exemplary discrete modules of movement equations 1.5 and 1.6 are graphically illustrated.

Figure 13:
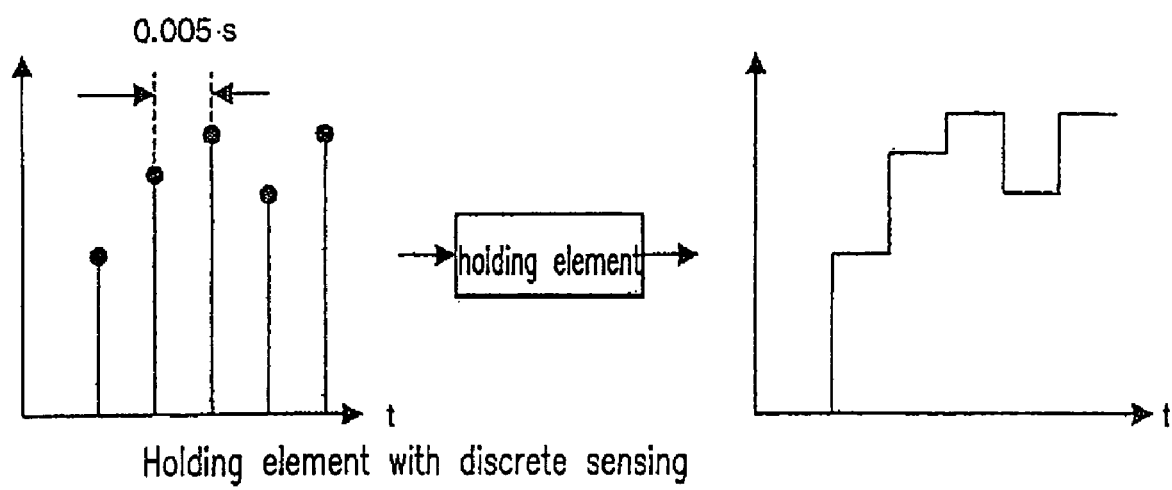
FIG. 13 shows two diagrams with a holding element with discrete sensing; and, FIG. 14 shows a simulation of a step-response function of a real and modeled system.

The differential equation on which the discrete-time model is based may be derived from a continuous-time first-order model and a hold element of zero-order. This is graphically indicated in FIG. 13, a hold element being used with discrete sensing.

An identification of a discrete-time first order model (least squares method) is described below. A simple and easy to implement identification method is the so-called least squares method (LS method). A special case may be the method of the least error squares for a first-order model. The following equations result:

$$n_u(k) = A \cdot n_u(k-1) + B \cdot u(k-1) \qquad \text{Equation 2.1}$$

$$n(k) = n_u(k) + z(k) \qquad \text{Equation 2.2}$$

k: discrete time step
n: speed
u: input voltage
z: interference signal (white noise).

This differential equation 2.1 may result from a continuous-time first-order model combined with a zero-order hold element. This is graphically indicated in FIG. 18, a hold element with discrete sensing being used. The output nu may preferably also be provided with an interference z according to equation 2.2. This interference z may represent the uncertainties of the system, such as friction or the like, and the signal processing, such as measuring noise or the like. Parameters A and B of the above movement equation 2.1 may be identified in the following manner:

1. Summation of interim quantities; during the shift and select operations, the motor voltage and the motor speed of shift and select motor may be read in at discrete time steps (position controller interrupt of approximately 5 ms). With these values, the following interim quantities may be calculated, the following equations having been used beforehand to some extent:

$$\Phi_{nn}(0) = \sum_{0}^{N-1} n(i) \cdot n(i). \qquad \text{Equation 2.3}$$

$$\Phi_{un}(0) = \sum_{0}^{N-1} n(i) \cdot u(i). \qquad \text{Equation 2.4}$$

$$\Phi_{uu}(0) = \sum_{0}^{N-1} u(i) \cdot u(i). \qquad \text{Equation 2.5}$$

$$\Phi_{nn}(1) = \sum_{1}^{N} n(i) \cdot n(i-1). \qquad \text{Equation 2.6}$$

$$\Phi_{un}(1) = \sum_{1}^{N} n(i) \cdot u(i-1). \qquad \text{Equation 2.7}$$

2. A calculation of model parameters may be provided; if the calculation of the interim quantity is concluded after the free-running movement of the shift and select operation, parameters A and B may preferably be calculated by the equations already mentioned:

$$A = \frac{-\Phi_{uu}(0) \cdot \Phi_{nn}(1) + \Phi_{un}(0) \cdot \Phi_{un}(1)}{\Phi_{uu}(0) \cdot \Phi_{nn}(0) - [\Phi_{un}(0)]^2}. \qquad \text{Equation 2.8}$$

$$B = \frac{-\Phi_{un}(0) \cdot \Phi_{nn}(1) + \Phi_{nn}(0) \cdot \Phi_{un}(1)}{\Phi_{uu}(0) \cdot \Phi_{nn}(0) - [\Phi_{un}(0)]^2}. \qquad \text{Equation 2.9}$$

3. A modeling of the transmission motor may be provided; the model of the motors may preferably be composed of a first-order model and an integrator. The current motor speed may then be calculated from the motor speed and the motor voltage of an interrupt of e.g. 5 ms. For this purpose, the equations already mentioned may be used:

$$n_k = A \cdot n_{k-1} + B \cdot u_{k-1} \qquad \text{Equation 2.10.}$$

$$x_k = x_{k-1} + K \cdot T_A \cdot n_k \qquad \text{Equation 2.11.}$$

K: conversion factor (motor-actuator ratio)
TA: sampling period (position controller interrupt; 5 ms)
nk: modeled motor speed
xk: modeled motor increments.

The aforementioned identification strategy may be checked by a simulation. In the simulation a position-controlled operation is carried out. The output voltages and motor speeds may be used for the identification. The identified parameters may be used in a model of the transmission motors. In an additional simulation, it is possible to compare the real and the modeled motor speeds and positions in order to check the precision of the identification. The identification may occur in the discrete-time illustration while the simulation is carried out using continuous-time parameters. Therefore, it is necessary to convert the identified parameters into the continuous representation. default data.

For example: select motor $$Ra = 0.45 \, \Omega$$

$$Cm = 0.025 \, Vs$$

$$Jm = 1.6 \times 10^{-5} \frac{kg}{m^2}$$

$$dreib = 0.8 \times 10^{-4} \, Nms$$

The continuous-time illustration is as follows:

| | | |
|---|---|---|
| Real parameters | ak = −91.8 | bk = 3472.2 |
| Identified parameters | ak = −91.8 | bk = 3472.2 |

Figure 14:
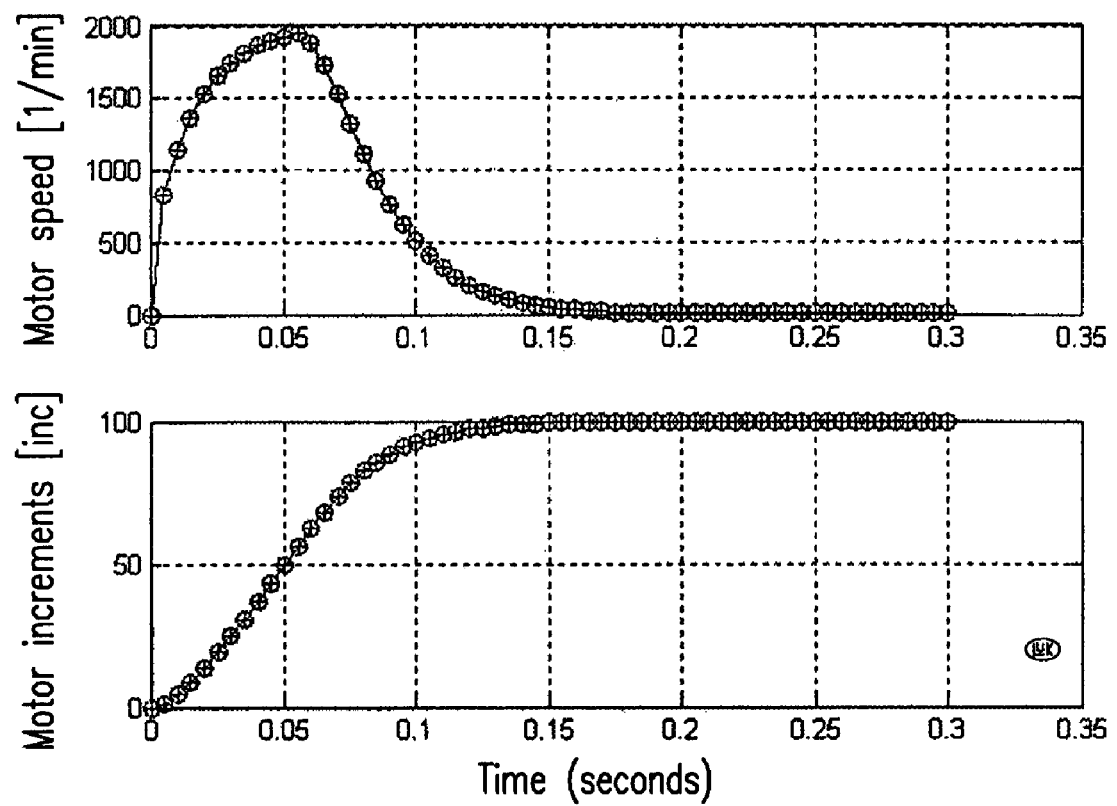

Illustrated in FIG. 14 is a simulated step-response of a real system and a system is having identified parameters A, B. The first-order characteristic can be reproduced exactly. However, in an implementation it should be noted that, on the one hand, the integer arithmetic must be used and, on the other hand, the real system in the vehicle should have no exact first-order characteristic. Illustrated in the simulation in FIG. 14 is the step-response of a real system labeled with plus signs and a modeled system labeled with zeros.

The simulation shows that this identification method of a first-order model has a very high precision with simple programming.

In summary, it may be determined that the online identification for the transmission actuators is especially advantageous if an adaptation is additionally provided. The plant behavior of the ASG actuator shows a first-order characteristic in relation to the armature voltage as an input variable and the motor speed as an output variable during a free-running movement within the shift gate.

The patent claims submitted with the application are proposed formulations without prejudice to the achievement of further patent protection. The applicant reserves the right to submit claims for further combinations of features previously only disclosed in the description and/or the drawings.

References used in dependent claims refer to the further development of the subject matter of the principle claim via the features of the particular dependent claim; they are not to be understood as a renunciation of achieving independent protection for the combination of features for the dependent claims that are referenced.

Since the subject matter of the dependent claims may constitute separate and independent inventions in relation to the state of the art on the priority date, the applicant reserves the right to make them the subject matter of independent claims or division declarations. Furthermore, they may also contain independent inventions that have a design that is independent of the subject matter of the preceding dependent claims.

The embodiments are not to be understood as a restriction of the invention. Rather, numerous amendments and modifications are possible within the context of the current disclosure, especially those variants, elements and combinations and/or materials that one skilled in the art may learn, for example, by combining individual ones together with those in the general description and embodiments in addition to features and/or elements or methodological steps described in the claims and contained in the drawings with the aim of achieving the objective and leading to a new subject matter or new methodological steps or sequences of steps via combinable features, even as far as production, testing and work procedures are concerned.

What is claimed is:

1. In a transmission closed-loop control system of an automatic vehicle transmission, a method for the compensation of plant changes comprising the steps of:
   detecting a plant change in an electric transmission motor for the vehicle transmission; and,
   compensating said plant change in the electric transmission motor for the vehicle transmission, wherein, there is differentiation at least between temporarily occurring temperature-related plant changes and changes of closed-loop response characteristic having a long-term effect that are a function of the operation and hardware, and wherein the electric transmission motor is for selecting a gear to be engaged in the transmission or engaging a gear in the transmission.

2. The method as described in claim 1, wherein at least one parametric model of the transmission control system is used.

3. The method as described in claim 2, wherein the parameters of the model are identified during a gear change while taking into consideration predetermined boundary conditions.

4. The method as described in claim 3, wherein a parameter estimating procedure is implemented in the transmission control system.

5. The method as described in claim 3, wherein a voltage ($U_k$) that is compensated and limited to maximum battery voltage and/or at least one measured transmission motor speed (n) are used for the identification of the model parameters.

6. The method as described in claims 3, wherein variations between the identified model parameters and parameters of the reference model are used for the dynamic compensation.

7. The method as described in claim 1, wherein during shift and select operations signals of input voltage and/or speed of transmission motors are used to identify the closed-loop response characteristic of the motors in an online state.

8. The method as described in claim 7, wherein a discrete motor model is used for a transmission actuating mechanism.

9. The method as described in claim 8, wherein at least one PT1-element and one I-element (integrator) are used in the motor model.

10. The method as described in claim 9, wherein the input voltage ($u_{k-1}$) and the motor speed ($N_{k-1}$) of a position controller interrupt, which are used as input variables of the PT1-element, are acquired beforehand.

11. The method as described in claim 9, wherein currently modeled motor speed ($n_k$) is converted from the I-element (integrator) into corresponding motor increments ($x_k$).

12. The method as described in claim 9, wherein the following equation is used for the PT1-element:

$$n_k = A \cdot n_{k-1} + B \cdot u_{k-1}.$$

13. The method as described in claim 9 wherein the following equation is used for the I-element:

$$x_k = x_{k-1} + K \cdot T_A \cdot n_k.$$

14. The method as described in claim 7 wherein various states are defined for the online identification.

15. The method as described in claim 14, wherein transitional conditions are selected for the various states.

16. The method as described in claim 15, wherein at least one control-side observer is used to estimate an applied current strength for a transmission motor of the transmission actuating mechanism.

17. The method as described in claim 16, wherein current strength of each transmission motor is estimated by the observer and a control-side current strength limitation is provided by the observer.

18. The method as described in claim 17, wherein the loop-response characteristic of each transmission motor is identified by the observer and the required current strength is estimated via the determined plant parameters.

19. The method as described in claim 18, wherein at least the applied voltage and/or the measured motor speed are estimated as plant parameters.

20. The method as described in claim 18, wherein the loop-response characteristic of each transmission motor is represented with at least one $PT_1$-model having variable parameters.

21. The method as described in claim 16, wherein the following equation is used as a movement equation for the transmission motor:

$$\dot{n} = a \cdot n + b \cdot u.$$

22. The method as described in claim 21, wherein parameters a and b are identified during a gear change in the position-controlled state.

23. The method as described in claims 16, wherein the motor voltage (U), the motor speed (n) and the current strength (I) are estimated via the following equation:

$$I = \frac{U - k_\Phi \cdot \frac{2\pi}{60} n}{R}.$$

* * * * *